Patented Nov. 30, 1926.

1,608,917

UNITED STATES PATENT OFFICE.

ALBERT WIDDIS, OF TAWAS CITY, MICHIGAN.

PROCESS FOR PREPARING SOIL.

No Drawing.   Application filed December 17, 1924.   Serial No. 756,545.

This invention relates to the treatment of the land of the so-called semi-arid regions to cause it to retain a maximum amount of the sparse rainfall or of the irrigating water applied thereto, and to the treatment of light or porous soils through which water percolates too readily to sustain farm crops; and this invention consists in mixing with the soil a water absorbent and retaining material which will permit the water to be taken from it by plant roots; and in establishing a layer of such material below the surface of the soil, which layer will effectually prevent the percolation beyond the reach of the plant roots.

In many regions the amount of rainfall would be sufficient for a very vigorous and luxuriant plant growth if the moisture of rainfall and available irrigation could be stored for the plants and be prevented from evaporating or sinking into the ground beyond the roots of the plants. My purpose is to provide miniature reservoirs to hold this moisture in such a manner that it is readily accessible for the plant roots. I do this by mixing a water-absorbent mineral with the surface soil or depositing substantial amounts of this material at predetermined distances from the surface of the soil, so that the moisture may be absorbed and stored thereby and may be taken up by the plants.

The difference between so-called heavy and light soils is not merely a question of weight of the soils when dry, but the average weight in the field, the one being usually largely clay and tenacious of water and the other largely sand and having little capacity to hold water.

The material which has shown itself best adapted for the purpose of storing moisture is bentonite or montmorillonite, names that have been applied to a group or series of clay-like materials embodying hydrous aluminum silicates combined with an alkaline oxide and alkaline earth content of from about five to ten percent, high absorptive powers, and very strong colloidal properties. When wetted these minerals absorb more than three times their own weight in water and become a soft translucent gelatinous mass, easily penetrated by plant roots and easily drained by them.

The mineral may be broken up into lumps or smaller particles of more or less fineness and placed in the ground about the roots of trees or shrubs; or, it may be ground to a powder and then "drilled" into the land in the same manner as fertilizer is supplied, and then, by harrowing, thoroughly mixed with the soil; or it can be placed in seed holes or thoroughly mixed with the soil of the seed holes which are made to receive the seed when planted in hills. Or the mineral may be made into an emulsion and poured into the seed holes, or into small holes around the roots of plants, or onto the ground around the stems or stalks of plants. Or the broken or ground mineral may be placed in the bottoms of the furrows as the land is plowed, thus locating a substantially continuous layer thereof at substantially even distance from the surface of the ground, which, as it swells, will effectually stop the loss of water by percolation. Or, the emulsion may be sprayed or poured onto the bottoms of the furrows to accomplish the desired result of establishing a permanent and substantially continuous layer that will effectually stop percolation of water by plugging the pores in the soil as the bentonite swells.

A desirable method for depositing this material is to plow the ground somewhat deeper than it is usually plowed, say ten inches deep, and then deposit a layer of this material, either in the form of powder or as an emulsion of the consistency of medium thick cream, on the bottom of the furrow. This results in a substantially continuous layer under the normal plowed area. The subsequent plowings should be shallower so as not to disturb this layer of water-retaining material. About four tons of bentonite per acre will be found adequate for the purpose of establishing a layer.

I claim:—

1. The process of preparing soil for plant life consisting in loosening the soil to a point below the usual plowing depth, and placing at the bottom of such loosened soil a substantially continuous layer of water-absorbent and water-retaining bentonite.

2. The process of preparing land for plant life consisting in plowing the land beyond the usual plowing depth, and placing in the bottoms of the furrows so produced a layer of an emulsion of bentonite, to constitute a substantially continuous water-absorbent and water-retaining body.

3. The process of preparing soil for plant life consisting of loosening the soil and placing at the bottom of such loosened soil a substantially continuous layer of water-absorbent and water-retaining bentonite.

4. The process of preparing land for plant life consisting in loosening the land and placing in the bottom of the loosened portion so produced a layer of an emulsion of bentonite to constitute a substantially water-absorbent and water-retaining body.

ALBERT WIDDIS.